United States Patent [19]

Taubitz et al.

[11] Patent Number: 5,053,458

[45] Date of Patent: Oct. 1, 1991

[54] THERMOPLASTIC MOLDING MATERIALS

[75] Inventors: Christof Taubitz, Wachenheim; Erhard Seiler, Ludwigshafen; Klaus Boehlke, Hessheim; Klaus Bronstert, Carlsberg; Daniel Wagner, Bad Durkheim, all of Fed. Rep. of Germany

[73] Assignee: BASF Aktiengesellschaft, Ludwigshafen, Fed. Rep. of Germany

[21] Appl. No.: 507,086

[22] Filed: Apr. 5, 1990

Related U.S. Application Data

[63] Continuation of Ser. No. 210,031, Jun. 22, 1988, abandoned.

[30] Foreign Application Priority Data

Jul. 8, 1987 [DE] Fed. Rep. of Germany ....... 3722502

[51] Int. Cl.$^5$ .................... C08L 53/02; C08L 71/12
[52] U.S. Cl. ..................................... 525/92; 525/391; 525/392; 525/397; 525/905
[58] Field of Search ............................ 525/92, 905, 68

[56] References Cited

U.S. PATENT DOCUMENTS

| 4,097,556 | 6/1978 | Toyama et al. | 525/68 |
| 4,732,938 | 3/1988 | Grant et al. | 525/92 |
| 4,743,651 | 5/1988 | Shibuya et al. | 525/92 |

Primary Examiner—Jacob Ziegler
Attorney, Agent, or Firm—Oblon, Spivak, McClelland, Maier & Neustadt

[57] ABSTRACT

Thermoplastic molding materials contain, as essential components,

A) from 5 to 94% by weight of a polyamide,
B) from 5 to 94% by weight of a polyphenylene ether,
C) from 1 to 20% by weight of a partially hydrogenated PQP' block copolymer, where
  $\alpha$) the blocks P and P' consist of vinylaromatic monomers and the total amount of these blocks in the block copolymer is from 25 to 40% by weight,
  $\beta$) the number average molecular weight of block P is not more than 8,000 and is smaller than the number average molecular weight of block P',
  $\gamma$) block Q consists of conjugated diene monomers and accounts in total for from 60 to 75% by weight of the block copolymer and
  $\delta$) from 5 to 30% by weight of the double bonds in block Q are not hydrogenated, and
D) from 0 to 50% by weight of a vinylaromatic polymer.

4 Claims, No Drawings

THERMOPLASTIC MOLDING MATERIALS

This application is a Continuation of application Ser. No. 210,031, filed on June 22, 1988, now abandoned.

The present invention relates to novel thermoplastic molding materials containing, as essential components, A) from 5 to 94% by weight of a polyamide, B) from 5 to 94% by weight of a polyphenylene ether, C) from 1 to 20% by weight of a partially hydrogenated PQP' block copolymer, where α) the blocks P and P' consist of vinylaromatic monomers and the total amount of these blocks in the block copolymer is from 25 to 40% by weight, β) the number average molecular weight of block P is not more than 8,000 and is smaller than the number average molecular weight of block P', γ) block Q consists of conjugated diene monomers and accounts in total for from 60 to 75% by weight of the block copolymer and δ) from 5 to 30% by weight of the double bonds in block Q are not hydrogenated, and D) from 0 to 50% by weight of a vinylaromatic polymer, the percentages A) to D) summing to 100%.

The present invention furthermore relates to a process for the preparation of such molding materials and to moldings produced therefrom.

Polyphenylene ethers (PPE) are plastics which have very good thermal, mechanical and electrical properties but have only very poor resistance to solvents. This also applies to a commercial blend of polyphenylene ethers and styrene polymers. The usefulness of such products is therefore restricted.

U.S. Pat. No. 3,379,792 discloses that the melt flow properties of polyphenylene ethers are improved by the addition of up to 25% by weight of a polyamide. Furthermore, this patent states that when more than 20% by weight of a polyamide are added, other properties of the polyphenylene ether are very adversely affected.

GB-A 2 054 023 furthermore discloses blends of polyphenylene ethers and polyamides having high polyamide contents; to obtain good properties, however, a fairly long mixing process in the melt is required. However, exposure to such high temperatures over prolonged periods readily results in degradation.

EP-A 24 120 and EP-A 46 040 describe blends of polyamides, unmodified polyphenylene ethers and copolymers of vinylaromatic monomers and maleic anhydride and/ or maleimide. The materials described in these patents, and the moldings produced therefrom, have unsatisfactory impact strength, particularly when rubber is used as an additional component, and a melt flow index (MFI) which is much too low for many intended uses.

EP-A 176 058 and EP-A 176 061 disclose blends of polyphenylene ethers and hydrogenated linear block copolymers of monoalkenylaromatic monomers and dienes, in which not less than 95% of the diene units are hydrogenated. The long-term stability of these products is unsatisfactory.

Dutch Patent Application 73/2712 describes glass fiber reinforced thermoplastic molding materials consisting of polyamides, which may be mixed with polyphenylene ethers, the said molding materials containing thermoplastic block copolymers of the type $(B-S)_n$, $(S-B)_{n-1}-S$ or $(B-S)_n-B$, where B is a conjugated diene, S is a vinylaromatic monomer and n is an integer of from 2 to 5.

U.S. Pat. No. 4,085,163 and U.S. Pat. No. 4,088,626 describe blends of two different thermoplastic polymers and block copolymers, which contain two or more terminal blocks of vinylaromatic monomers and one or more completely hydrogenated block of conjugated dienes. In these products, the impact strength is unsatisfactory, particularly at low temperatures.

It is an object of the present invention to provide thermoplastic molding materials which, in addition to good processibility, possess good thermal, mechanical and dielectric properties. In particular, the molding materials should have high impact strength (including multiaxial impact strength) and good resistance to solvents.

We have found that this object is achieved, according to the invention, by the thermoplastic molding materials defined at the outset.

Preferred materials of this type are described in the subclaims.

The novel molding materials contain, as component A, from 5 to 94% by weight of one or more polyamides. Linear polyamides, for example those having a relative viscosity of from 2.2 to 5.0, measured in 1% strength by weight solution in 96% strength by weight sulfuric acid at 23° C., are suitable. Preferred polyamides are those which are derived from lactams having from 7 to 13 ring members, such as polycaprolactam, polycapryllactam or polylaurolactam, and polyamides which are obtained by reacting dicarboxylic acids with diamines. Examples of suitable dicarboxylic acids are alkanedicarboxylic acids of 6 to 12, in particular 6 to 10, carbon atoms and terephthalic acid and isophthalic acid as well as any mixtures of these acids.

Examples of diamines are alkanediamines of 6 to 12, in particular 6 to 8, carbon atoms, as well as m-xylylenediamine, bis-(4-aminophenyl)-methane, bis-(4-aminohexyl)-methane and 2,2-bis-(4-aminophenyl)-propane, as well as mixtures of these.

It is also possible, and sometimes advantageous, to use blends of the stated polyamides. Nylon 6 (polycaprolactam), nylon 66 (polyhexamethyleneadipamide) and polyamides which are obtained from hexamethylenediamine and isophthalic acid or terephthalic acid have become particularly important industrially.

Preferred molding materials contain from 15 to 80, in particular from 20 to 70, % by weight of thermoplastic polyamides.

The novel molding materials contain, as component B, from 5 to 94, preferably from 15 to 80, in particular from 20 to 70, % by weight of one or more polyphenylene ethers.

Components B are known polyphenylene ethers, which may be prepared, for example, from phenols which are disubstituted in the o-position, by oxidative coupling. Preferably used polyphenylene ethers are those which are compatible with vinylaromatic polymers, i.e. completely or substantially soluble in these polymers (cf. A. Noshay, Block Copolymers, pages 8-10, Academic Press, 1977 and O. Olabisi, Polymer-Polymer Miscibility, 1979, pages 117-189).

The polyphenylene ethers used generally have a weight average molecular weight of from 10,000 to 80,000, preferably from 15,000 to 60,000.

A few polyphenylene ethers may be mentioned here merely by way of example, such as those stated in, inter alia, O. Olabisi, Loc. cit., pages 224-230 and 245, for example poly-(2,6-diethyl-1-phenylene) oxide, poly-(2-methyl-6-ethyl-1,4-phenylene) oxide, poly-(2-methyl-6-propyl-1,4-phenylene) oxide, poly-(2,6-dipropyl-1,4-phenylene) oxide, poly-(2-ethyl-6propyl-1,4-phenylene) oxide and preferably poly-(2,6-dimethyl-1,4-phenylene) oxide, or copolymers, such as those which contain 2,3,6-trimethylphenol, as well as polymer blends. However, poly-(2,6-dimethyl-1,4-phenylene) oxide is particularly preferred.

In a preferred embodiment, a modified polyphenylene ether which is prepared by reacting components $b_1$), $b_2$), $b_3$) and, if required, $b_4$) and $b_5$) described below in detail is used as component B.

Components $b_1$) are polyphenylene ethers as described above. The amount of component $b_1$) is from 4.95 to 99.95, preferably from 10 to 99.95, in particular from 50 to 90, % by weight, based on the sum of components $b_1$) to $b_5$).

Component $b_2$), which may be present as a component of the modified polyphenylene ether, is a vinylaromatic polymer which is preferably compatible with the polyphenylene ether used.

The molecular weight of this polymer is in general from 15,000 to 2,000,000, preferably from 70,000 to 1,000,000.

Examples of preferred vinylaromatic polymers which are compatible with polyphenylene ethers are described in the abovementioned monography by Olabisi, pages 224–230 and 245. Vinylaromatic polymers of styrene, chlorostyrene, α-methylstyrene and p-methylstyrene may be mentioned here merely as typical examples; comonomers, such as (meth)acrylonitrile or (meth)acrylates may also be present as components in minor amounts (preferably not more than 20, in particular not more than 8, % by weight. A particularly preferred vinylaromatic polymer is polystyrene. Of course, it is also possible to use blends of these polymers.

Processes for the preparation of such vinylaromatic polymers are known per se and are described in the literature, so that further information is unnecessary here.

Mass, suspension, emulsion and solution polymerization may be mentioned here merely as examples of suitable polymerization processes.

The amount of the vinylaromatic polymer $b_2$) in component B) is from 0 to 90, preferably from 0 to 70, in particular from 0 to 60, % by weight.

When fumaric acid ($b_{31}$) is used as component $b_3$), it has frequently proven advantageous for the molding materials to have a certain minimum content of vinylaromatic polymer $b_2$), preferably not less than 1.95, in particular not less than 4.95, % by weight, based on component B).

The modified polyphenylene ethers B) contain one or more of the compounds $b_{31}$) to $b_{35}$) as essential components $b_3$).

In principle, it is also possible to use mixtures of different compounds $b_{31}$) to $b_{35}$), although it is generally advantageous to use only one of these types of compounds.

Component $b_{31}$) is fumaric acid. The amount of this is from 0.05 to 10, preferably from 0.1 to 5, % by weight, based on the sum of components $b_1$) to $b_5$).

Components $b_{32}$) are maleimides of the general formula I

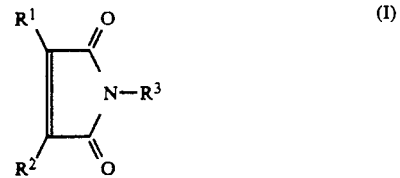

where $R^1$, $R^2$ and $R^3$ are each hydrogen or an alkyl, alkoxy, cycloalkyl, alkenyl, aryl, arylene or alkylene group of 1 to 12 carbon atoms.

$R^1$, $R^2$ and $R^3$ are preferably alkyl of 1 to 4 carbon atoms, e.g. methyl, ethyl, n-butyl, isobutyl or tertbutyl, cycloalkyl of not more than 8 carbon atoms or phenyl which may be unsubstituted or alkyl-substituted or alkoxy-substituted.

N-methylmaleimide, N-butylmaleimide, N-cyclohexylmaleimide, N-phenylmaleimide, N-(p-methylphenyl)-maleimide, N-(3,5-dimethylphenyl)-maleimide, N-(p-methoxyphenyl)-maleimide, N-benzylmaleimide, N-(1-naphthyl)-maleimide and mixtures of these may be mentioned as examples of preferred maleimides. Among these, N-phenylmaleimide is particularly preferred.

The amount of the maleimide of the general formula I is from 0.05 to 10, preferably from 0.1 to 5, % by weight, based on the sum of components $b_1$) to $b_5$).

Other suitable components $b_3$) are monomers which contain amide groups and one or more polymerizable double bonds, preferably those of the general formula II or III

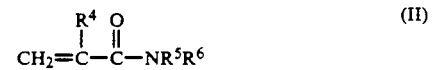

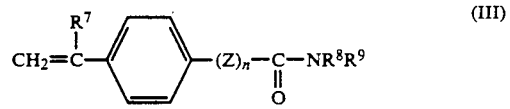

where $R^4$, $R^5$, $R^6$, $R^7$, $R^8$ and $R^9$ are each hydrogen, an alkyl or alkoxy group of 1 to 12 carbon atoms, cycloalkyl of not more than 12 carbon atoms or aryl and Z is alkenyl of 1 to 12 carbon atoms and n is 0 or 1, preferably 0.

Preferred substituents $R^5$, $R^6$, $R^8$ and $R^9$ are alkyl of 1 to 10 carbon atoms, cycloalkyl of not more than 8 carbon atoms and aryl, preferably phenyl. $R^4$ and $R^7$ are each preferably H or methyl.

Examples are acrylamide, N-methyl-, N-ethyl-, N-propyl-, N-butyl-, N-pentyl-, N-hexyl-, N-heptyl-, N-octyl-, N-nonyl- and N-(2-ethylhexyl)-acrylamide, N-cyclohexylacrylamide, N-phenylacrylamide, the corresponding N,N derivatives, such as N,N-dimethylacrylamide, and the corresponding methacrylamides, as well as mixtures of these.

Acrylamide, methacrylamide, N-phenylacrylamide and N-phenylmethacrylamide are preferred.

The amount of component $b_{33}$) is from 0.05 to 10, preferably from 0.1 to 10, in particular from 1 to 5, % by weight, based on the sum of components $b_1$) to $b_5$).

Another suitable component $b_3$) is a monomer which contains lactam groups and one or more polymerizable double bonds ($b_{34}$).

Preferably used lactams are those of the general structure IV

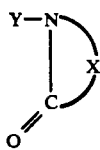

where X is straight-chain or branched alkylene of 2 to carbon atoms and Y is of the general formula

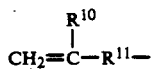

where $R^{10}$ is hydrogen or an alkyl or alkoxy group of 1 to 4 carbon atoms and $R^{11}$ is a divalent substituent

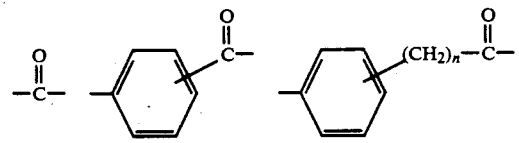

where n is an integer from 1 to 4.

Preferred substituents Y very generally are vinyl, acryloyl, methacryloyl or radicals having basic styrene structures.

Lactam units which are polymerizable or copolymerizable to give polyamides, as described in Houben-Weyl, Methoden der organ. Chemie, Volume X/2, pages 511-587 (1958) and Volume XIV/2, pages 111-131, are particularly preferred. Examples are:

βpropiolactams (azetidin-2-ones), such as

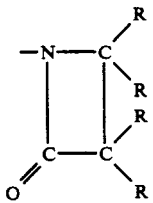

where the radicals R are identical or different alkyl groups of 1 to 6 carbon atoms or hydrogen. Compounds of this type are described in R. Graf, Angew. Chem. 74 (1962), 523-530, and H. Bastian, Angew. Chem. 80 (1968), 304-312.

3,3'-dimethyl-3-propiolactam may be mentioned as a typical example of this group.

Other preferred lactam units are 2-methylpyrrolidones

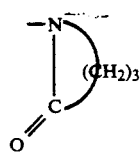

ε-caprolactam, such as

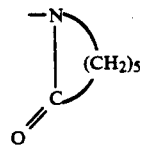

and furthermore 7-enantholactam, 8-capryllactam and 12-laurolactam, as described in K. Dachs, Angew. Chem. 74 (1962), 540-545. 2-pyrrolidones and 6-caprolactams are very particularly preferred.

It is also possible to use mixtures of these compounds.

The lactam units are preferably incorporated in the polyphenylene ether B via a carbonyl group at the nitrogen, as shown in general terms below.

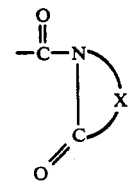

A particularly preferred example of a component $b_{34})$ is N-(meth)acryloyl-ε-caprolactam

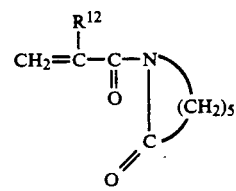

where $R^{12}$ may be hydrogen or methyl.

The amount of component $b_{34})$ is from 0.05 to 10, preferably from 0.1 to 10, in particular from 0.5 to 5, % by weight, based on the sum of components $b_1)$ to $b_5)$.

Components $b_{35})$ are half-esters or half-amides of α, β-unsaturated dicarboxylic acids. Examples of preferred dicarboxylic acids are maleic acid, fumaric acid, chloromaleic acid, dichloromaleic acid, methylmaleic acid, butenylsuccinic acid and tetrahydrophthalic acid, of which maleic acid and fumaric acid are particularly preferred.

For the preparation of the half-esters or half-amides used according to the invention, the acids or their anhydrides can be reacted with the appropriate alcohols or amines, respectively. Appropriate processes are known per se and are described in the literature, so that further information is unnecessary here.

Preferably used alcohols for the preparation of the half-esters are primary and secondary monoalcohols, such as methanol, ethanol, n-propanol, isopropanol, n-butanol, isobutanol, pentanols, hexanols, heptanols, octanols, e.g. 2-ethylhexyl alcohol, and higher alcohols, such as dodecanols, and cycloaliphatic alcohols, e.g. cyclohexanol. Alcohols containing aromatic structural units, e.g. benzyl alcohol, are also suitable. In addition to C, H and O, the alcohols may also contain hetero atoms such as N, O, S and Si in the main chain or as substituents. Finally, alcohols containing keto groups in the chain or containing halogen substituents may also be mentioned. However, alkanols of 1 to 6 carbon atoms are preferred.

Examples of amines for the preparation of the half-amides used according to the invention are, very generally, secondary amines and N-alkylanilines. Examples of these are N-methyl- and N-ethylalkylamines and N-methylaniline. As in the case of the alcohols, the amines too may contain hetero atoms and functional groups.

Very generally, half-esters are preferred to the half-amides. The amount of $b_{35}$) is from 0.05 to 10, preferably from 0.1 to 5, % by weight, based on the total weight of component B).

Molding materials which contain the component $b_{35}$) frequently have particularly good flow properties, i.e. particularly high melt flow indices (MFI).

If necessary, other comonomers $b_4$) which react with, or are grafted onto, the components $b_1$) and, where relevant, $b_2$) under the preparation conditions may also be used in the preparation of the modified polyphenylene ether B. Examples of these are acrylic acid, methacrylic acid, acrylates, methacrylates and vinylaromatic monomers, such as styrene, α-methylstyrene and vinyltoluene, to mention but a few.

The amount of component $b_4$) is from 0 to 80, preferably from 0 to 45, in particular not more than 20, % by weight, based on the sum of components $b_1$) to $b_5$). Particularly preferred molding materials are those which do not contain component $b_4$).

Up to 20% by weight of free radical initiators may be used as component $b_5$) in the preparation of the modified polyphenylene ethers B).

The amount of component $b_5$) is as a rule less than the sum of the amount of components $b_3$) and $b_4$). It is preferably an organic peroxide or an azo compound.

Organic peroxides having a half life of from 1 to 30 sec at 200° C. are particularly preferred. The choice of the free radical initiator depends on the desired reaction temperature.

Examples of free radical initiators are: di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butylperoxy-3,3,5-trimethylcyclohexane, tert-butyl peroxyisopropylcarbonate, tert-butyl peroxy-3,3,5-trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butylperoxyisopropyl)benzene, di-tert-butyl peroxide, diisopropylbenzene monohydroperoxide, cumene hydroperoxide, tert-butyl hydroperoxide, 2,2-azobis-(2,4-dimethylvaleronitrile) and azobisisobutyronitrile, dicumyl peroxide being particularly preferred.

It has frequently proven advantageous to omit the component $b_5$). This is true in particular when fumaric acid ($b_{31}$) is used as component $b_3$), since in this case undesirable side reactions may occur in certain circumstances when free radical initiators are used.

For the preparation of the modified polyphenylene ether B, the components $b_1$) to $b_5$) can be reacted with one another at from 250° to 350° C., preferably from 265° to 295° C. Extruders are particularly suitable for this purpose since in general they also achieve thorough mixing of the components. The residence times are in general from 0.5 to 30, preferably from 1 to 3, minutes. Twin-screw extruders are particularly suitable for the novel process.

A particularly preferred variant of the process is described below.

The components $b_1$) to $b_5$) are preferably metered in together and melted in a melting zone. The extruder screw in the melting zone preferably contains kneading elements. The melting zone is followed by the reaction zone, which preferably contains kneading elements and additional kneading elements having a downstream backward-conveying thread. A devolatilization zone for removing the volatile components is preferably located upstream of the product discharge. The extruded melt is generally granulated, and the granules are used for the preparation of the novel molding materials.

In principle, the preparation of the modified polyphenylene ether may also be carried out in any reaction vessel which permits reaction of the components with one another.

The novel thermoplastic molding materials contain, as component C), from 1 to 20, preferably from 5 to 20, in particular from 7 to 18, % by weight of a partially hydrogenated PQP′ block copolymer, where α) the blocks P and P′ consist of vinylaromatic monomers and the total amount of these blocks in the block copolymer is from 25 to 40% by weight, β) the number average molecular weight of block P is not more than 8,000 and is less than the number average molecular weight of block P′, γ) block Q consists of conjugated diene monomers and in total accounts for from 60 to 75% by weight of the block copolymer and δ) from 5 to 30% by weight of the double bonds in block Q are not hydrogenated.

In the block structures of the general formula P-Q-P′, the P and P′ blocks are therefore not elastomeric, whereas the Q blocks are elastomeric.

An essential feature of the block copolymers C) is their asymmetric block structure, i.e. the fact that the molecular weight of block P is not more than 8,000, preferably not more than 5,000, and in any case is less than the molecular weight of block P′.

Suitable monovinylaromatic hydrocarbons for the blocks P and P′ are styrene and substituted styrenes which may be alkylated or halogenated in the nucleus or in the side chain. Examples of these are styrene, o- and p-methylstyrene, ethylvinylbenzene, tert-butylstyrene, α-methylstyrene, p-chlorostyrene and m-chlorostyrene. It is of course also possible to use mixtures of a plurality of vinylaromatic compounds.

Styrene, α-methylstyrene and p-methylstyrene are preferably used.

The amount by weight of the monovinylaromatic compounds is from 25 to 40, in particular from 30 to 40, % by weight, based on the total weight of the monomers used and accordingly also from 25 to 40% by weight, based on the total weight of the block copolymer.

Suitable conjugated diene monomers for the synthesis of the blocks Q are, in particular, 1,3-butadiene, 2,3-dimethylbutadiene and isoprene and 1,3-pentadiene. The diene content is from 60 to 75, preferably from 60 to 70, % by weight, based on the total weight of the monomers used in the preparation of component C) and accordingly also on block copolymer C).

The block copolymers C) may be prepared, for example, by solution polymerization, which is described in somewhat more detail below.

Particularly suitable solvents for the polymerization are straight-chain and branched aliphatic hydrocarbons, such as n-pentane, n-octane, n-decane, isopentane, isooctane or 2,3-dimethylbutane, and unsubstituted or substituted cycloaliphatic and aromatic hydrocarbons, such as cyclopentane, cyclohexane, methylcyclohexane, decalin, benzene, toluene, ethylbenzene, cumene, mesitylene or tetralin, and mixtures of the abovementioned solvents. Cyclohexane has proven a particularly advantageous solvent in some cases.

To increase the content of 1,2-vinyl units in the block copolymer C), polar reagents may be added to the solvent. The amount of these reagents is in general from 0.01 to 2% by weight, based on the total weight of the solvent. Examples are ethers, such as tetrahydrofuran and diethyl ether, and tetramethylethylenediamine, of which tetrahydrofuran is particularly preferred.

The monomer concentration in the solvent is advantageously from 20 to 30% by weight.

The molecular weight of the copolymers C obtained after the polymerization is preferably from 20,000 to 250,000, prior to the hydrogenation. The molecular weight is determined by gel permeation chromatography and stated as the number average $\overline{M}_n$.

For the preparation of block copolymers in this molecular weight range, lithium alkyl catalysts are preferably used as catalysts, in amounts of from 0.5 to 10 moles per 100 kg of monomers. Examples of lithium alkyls are, in particular, methyllithium, ethyllithium, n- and sec-butyllithium and isopropyllithium, of which n- and sec-butyllithium are particularly preferred.

The hydrogenation of the blocks Q in the block copolymer C) is effected by a conventional process; care should be taken to ensure that predominantly the double bonds of the dienes are hydrogenated, and hydrogenation of the aromatic systems is substantially avoided. It must also be ensured that complete hydrogenation does not take place and that instead not less than 5-30, preferably 7-25, % by weight of the double bonds in block Q are retained.

The hydrogenation can be carried out, for example, by reacting the block copolymers with hydrogen under from 5 to 30, in particular from 10 to 20, bar at from 50° to 200° C. Examples of catalysts for this hydrogenation are homogenous nickel/aluminum catalyst systems prepared from nickel(II) octoate or acetylacetonate, bis(2,4-pentadienato)-nickel and aluminumtriethyl or aluminumtriisobutyl. These catalysts are generally used in amounts of from 0.3 to 7.0 mmol/kg of the hydrogenated polymer, the molar amount being based on the content of nickel.

The block copolymers C) can be worked up by removing the solvent, by stripping off the vapor or by means of devolatilization in an extruder.

The novel molding materials may contain vinylaromatic polymers as further component D), in an amount of not more than 50, preferably not more than 30, in particular from 3 to 20, % by weight, based on the sum of components A) to D). Preferred polymers are those which are compatible with polyphenylene ethers, such polymers having already been described for component $b_2$). For further details, reference may therefore be made to the statements for component $b_2$).

Component D) may furthermore be toughened. Such polymers are familiar to the skilled worker as high impact polystyrene (HIPS). For this purpose, the vinylaromatic polymers are prepared in the presence of an impact modifier or the vinylaromatic polymers are mixed with grafted rubbers. Examples of elastomeric polymers are polybutadiene, styrene/butadiene, styrene/b-butadiene, acrylonitrile/butadiene, ethylene/propylene, polyacrylate and polyisoprene rubbers.

In addition to the grafted rubbers which may be present in component D), such as polybutadiene, acrylate, styrene/butadiene, polybutene, hydrogenated styrene/butadiene, acrylonitrile/butadiene, ethylene/propylene and polyisoprene rubbers, the said rubbers may also be added in ungrafted form. Other examples of rubbers E) are styrene-grafted ethylene/propylene rubbers, thermoplastic ethylene/propylene rubbers, thermoplastic polyester elastomers, ethylene rubbers and ionomers.

The rubbers may be present in the novel molding materials in amounts of up to 40, preferably up to 30, % by weight, based on the sum of the components A) to D).

In addition to the components A) to D), the novel thermoplastic molding materials may also contain conventional additives and processing assistants. The amounts of these additives is in general not more than 40, in particular not more than 20, % by weight, based on the total weight of components A) to D).

Examples of additives are heat stabilizers, light stabilizers, lubricants, mold release agents and colorants, such as dyes and pigments, in conventional amounts. Other additives are reinforcing agents, such as glass fibers, asbestos fibers, carbon fibers or aromatic polyamide fibers, and/or fillers, such as gypsum fillers, synthetic calcium silicates, kaolin, calcined kaolin, wollastonite, talc or chalk, as well as flameproofing agents, such as phosphorus compounds, e.g. phosphates, phosphoric esters, phosphorous esters, phosphinic esters, phosphonous esters or organic phosphine oxides.

Low molecular weight or high molecular weight polymers are also suitable as additives.

The novel thermoplastic molding materials are advantageously obtained by mixing the individual components at from 250° to 320° C. in a conventional mixing apparatus, such as a kneader, a Banbury mixer or a single-screw extruder, but preferably in a twin-screw extruder. In order to obtain a very homogeneous molding material, thorough mixing is essential. The order in which the components are mixed can be varied; for example, two or, if required, three components may be premixed or all of the components may be mixed together.

It should be mentioned that, in the preparation of the molding materials, a reaction may sometimes occur among the components A) to D), so that the end product no longer contains a pure mixture of these components.

The novel molding materials have balanced properties, in particular low-temperature impact strength (including multiaxial impact strength) and good resistance to solvents.

They are particularly suitable for the production of moldings by injection molding or extrusion.

EXAMPLES 1 TO 20

Component A

A/1 Polycaprolactam having a relative viscosity of 3.91, measured in 1% strength by weight solution in m-cresol at 25° C. in an Ubbelohde viscometer.

A/2 Polyhexamethyleneadipamide having a relative viscosity of 2.6, measured as for A/1.

Component B

B/1 83.7% by weight of poly-(2,6-dimethyl-1,4-phenylene ether) (PPE) having a relative viscosity of 0.63 (measured in 1% strength by weight solution in $CHCl_3$ at 25° C.), 15% by weight of polystyrene (PS 144 C, melt flow index MFI at 200° C./5 kg load=24 kg/10 min) and 1.3% by weight of fumaric acid were metered into a twin-screw extruder (ZSK 53 from Werner & Pfleiderer), melted in a first zone using kneading elements at 255° C., reacted in a second zone with kneading and the use of kneading elements at 285° C. and then devolatilized in a devolatilization zone at 255° C. by reducing the pressure. The mean residence time in the extruder was 2.5 minutes. The emerging melt was passed through a water bath, granulated and dried. The granules had a fumaric acid content of 0.7% by weight and a pale yellow color.

B/2 80.5% by weight of PPE, 17% by weight of polystyrene (both as for B/1) and 2.5% by weight of monoethyl fumarate were reacted as for the preparation of B/1.

Component C

C/1 700 g of purified, anhydrous cyclohexane, 0.25 g of tetrahydrofuran and 18 g of styrene were initially taken under a nitrogen atmosphere in a stirred kettle. After the proton-active impurities had been completely titrated with a solution of sec-butyllithium, the calculated amount of initiator (4.5 millimoles of sec-butyllithium) was added and polymerization was carried out at 60° C. until conversion was complete.

Thereafter, 195 g of 1,3-butadiene were fed into the stirred kettle and polymerization was carried out once again until conversion was complete, a two-block polymer of the structure P-Q being obtained.

In a third step, a further 90 g of styrene were added and the reaction was once again carried out to completion, a P-Q-P' block copolymer being obtained.

The reactive terminal groups of the block copolymer were saturated by reaction with isopropanol.

The selective hydrogenation was carried out by adding a catalyst solution consisting of 1.3 g of nickel(II) acetylacetonate dissolved in 80 ml of toluene and mixed with 30 ml of aluminumtriisobutyl (20% strength in hexane) and under a hydrogen pressure of 15 bar and at a hydrogenation temperature of 80° C.

After the desired degree of hydrogenation had been achieved, which was determined by FTIR spectroscopy on samples removed, the copolymers were worked up by removing the solvent by devolatilization in an extruder.

C/2 The procedure described for C/1 was followed, except that the smaller amount of styrene was added for the formation of the P block in the third stage.

Specifically, the following amounts of the components were used:

| | |
|---|---|
| cyclohexane | 700 g |
| tetrahydrofuran | 0.2 g |
| styrene (P' block) | 90 g |
| 1,3-butadiene (Q block) | 195 g |
| styrene (P block) | 15 g |

The linear P-Q-P' block copolymers C) were characterized as follows: The glass transition temperature was determined according to K. H. Illers and H. Breuer, Kolloidzeitschrift, 190 (1) (1963), 16–34.

Molecular weight: The mean molecular weights (number average $\overline{M}_n$) were determined by gel permeation chromatography with reference to calibration curves for polystyrene and butadiene (calibration substances $\overline{M}_w/\overline{M}_n$ about 1) at 23° C. in 0.125% strength by weight tetrahydrofuran solution at a flow rate of 1.5 ml/min. In the case of block copolymers, the arithmetic weight average of the two calibration curves was used as a basis [cf. G. Glöckner, Polymercharakterisierung durch Flüssigkeitschromatographie, Verlag A. Huthig, Heidelberg, 1982].

The block structure was characterized by oxidative degradation of the unhydrogenated block copolymers with osmium tetroxide.

The residual double bond content of the olefinically unsaturated bonds in block Q was determined by Fourier transform IR analysis.

For comparison, a styrene/butadiene/styrene 3-block copolymer having a symmetric structure, a styrene content of 30% by weight and a weight average molecular weight of 50,000 (component C/V) was used in Examples 3, 6 and 9, the residual double bond content of block Q of the said copolymer being less than 3% by weight.

Component D

High impact polystyrene (HIPS) containing 8% by weight of butadiene and having a melt flow index (200° C./ 5.0 kg) of 15 g/10 min (Buna CB NX 529C, prepared by anionic polymerization).

For the preparation of the molding materials, components A) to D) were mixed at 305° C. in a twin-screw extruder, extruded and then granulated. To determine the notched impact strength according to DIN 53,453, test specimens were produced in an injection molding machine.

Table 1 shows the characteristic data for the block copolymers used, while Table 2 shows the composition of the molding materials and the results of the notched impact strength measurements.

TABLE 1

| Characterization of the block copolymers | | | | |
|---|---|---|---|---|
| | $\overline{M}^1$ | $\overline{M}^2_p$ | $\overline{M}^3_p$ | Glass transition temperature °C. | Double bond content (%) |
| C/1 | 67,000 | 4,000 | 20,000 | −61 | 14 |
| C/2 | 71,000 | 3,700 | 21,000 | −58 | 11 |
| C/V | 50,000 | 11,000 | 12,000 | −56 | <3 |

[1]Molecular weight of the block copolymer P-Y-P'
[2]Molecular weight of the block P
[3]Molecular weight of the block P'

TABLE 2

| Example No. | Component | | | | Notched impact strength [kJ/m²] | | |
|---|---|---|---|---|---|---|---|
| | A | B | C | D | 23° C. | −20° C. | −40° C. |
| 1 | 52.2 A/1 | 34.8 B/1 | 8.7 C/2 | 4.3 | 22 | 12 | 8 |
| 2 | 47.8 A/1 | 39.1 B/1 | 10.4 C/2 | 2.7 | 26 | 13 | 10 |
| 3* | 47.8 A/1 | 39.1 B/1 | 10.4 C/V | 2.7 | 17 | 5 | 3 |

TABLE 2-continued

| Example No. | Component | | | | Notched impact strength [kJ/m$^2$] | | |
|---|---|---|---|---|---|---|---|
| | A | B | C | D | 23° C. | −20° C. | −40° C. |
| 4 | 47.3 A/2 | 43.6 B/2 | 9.1 C/1 | — | 21 | 10 | 8 |
| 5 | 46.4 A/1 | 42.8 B/2 | 10.8 C/2 | — | 19 | 12 | 10 |
| 6* | 46.4 A/1 | 42.8 B/2 | 10.8 C/V | — | 13 | 4 | 4 |
| 7 | 50.4 A/2 | 27.1 B/1 | 10.8 C/1 | 11.7 | 18 | 11 | 8 |
| 8 | 45.0 A/2 | 45.0 B/1 | 7.2 C/2 | 2.8 | 18 | 10 | 7 |
| 9* | 45.0 A/2 | 45.0 B/1 | 7.2 C/V | 2.8 | 12 | 4 | 3 |

*Comparative Examples
(All amounts in percent by weight)

We claim:
1. A thermoplastic molding material containing, as essential components,
   A) from 5 to 94% by weight of a polyamide,
   B) from 5 to 94% by weight of a modified polyphenylene ether previously prepared from
      b$_1$) 4.95-99.95% by weight of a polyphenylene ether,
      b$_2$) 0-90% by weight of a vinylaromatic polymer,
      b$_3$) 0.05-10% by weight of a monomer selected from the group consisting of
      b$_{31}$) fumaric acid,
      b$_{32}$) a maleimide of the formula I

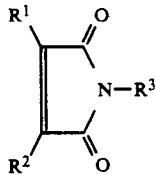

where R$^1$, R$^2$ and R$^3$ are each hydrogen or an alkyl, alkoxy, cycloalkyl, alkenyl, aryl, arylene or alkylene group of 1 to 12 carbon atoms,
      b$_{33}$) a monomer containing amide groups and a polymerizable double bond,
      b$_{34}$) a monomer containing lactam groups and a polymerizable double bond,
      b$_{35}$) a half-ester or half-amide of an α, β-unsaturated dicarboxylic acid and a mixture of two or more of the monomers b$_{31}$ to b$_{35}$,
      b$_4$) 0-80% by weight of further graft-active monomers and
      b$_5$) 0-20% by weight of a free radical initiator,
   C) from 1 to 20% by weight of a partially hydrogenated PQP' block copolymer, where
      α) the blocks P and P' consist of vinylaromatic monomers and the total amount of these blocks in the block copolymer is from 25 to 40% by weight,
      β) the number average molecular weight of block P is not more than 8,000 and is smaller than the number average molecular weight of block P',
      γ) block Q consists of conjugated diene monomers and accounts in total for from 60 to 75% by weight of the block copolymer and
      δ) from 5 to 30% by weight of the double bonds in block Q are not hydrogenated, and
   (D) from 0 to 50% by weight of a vinylaromatic polymer.

2. The molding material of claim 1, wherein the number average molecular weight of P' exceeds the number average molecular weight of P by a factor of at least 5.

3. The molding material of claim 1, wherein the number average molecular weight of P is not more than 5,000, and the number average molecular weight of P' exceeds the number average molecular weight of P by a factor of at least 5.

4. A molding from a thermoplastic molding material as claimed in claim 1.

* * * * *